United States Patent [19]

Shen et al.

[11] Patent Number: 4,705,347

[45] Date of Patent: Nov. 10, 1987

[54] OPTICAL FIBER COUPLER

[75] Inventors: Nelson M. Shen, San Jose; Marc F. Moisson, Los Altos; John P. Arrington, San Mateo; AbdulMohamed Tayeb, San Leandro, all of Calif.

[73] Assignee: Raychem Corp., Menlo Park, Calif.

[21] Appl. No.: 794,342

[22] Filed: Oct. 31, 1985

[51] Int. Cl.$^4$ ................................................ G02B 6/26
[52] U.S. Cl. ............................ 350/96.15; 350/96.10; 350/96.29
[58] Field of Search ............... 350/96.15, 96.16, 96.20, 350/96.29

[56] References Cited

U.S. PATENT DOCUMENTS

| | | | |
|---|---|---|---|
| 4,253,727 | 3/1981 | Jeunhomme et al. | 350/96.15 |
| 4,408,829 | 10/1983 | Fitzgerald, Jr. et al. | 350/96.29 |
| 4,449,210 | 5/1984 | Myer | 350/96.29 X |
| 4,530,078 | 7/1985 | Lagakos et al. | 350/96.29 X |
| 4,557,550 | 12/1985 | Beals et al. | 350/96.16 X |

FOREIGN PATENT DOCUMENTS 0054450 5/1977 Japan ................... 350/96.15

Primary Examiner—William L. Sikes
Assistant Examiner—Akm E. Ullah
Attorney, Agent, or Firm—Dennis E. Kovach; Herbert G. Burkard

[57] ABSTRACT

An optical coupler for withdrawing light from an optical fiber includes first and second movable members on which are mounted a plurality of bending posts offset longitudinally relative to one another. A retaining post, offset longitudinally from the bending posts, has a groove therein so that an optical fiber can be wrapped therearound. Thereafter, the first and second members are moved towards each other such that the bending posts interleaf and bend the optical fiber in a plurality of positions causing light to be emitted from the optical fiber at bent portions thereof, which light is detected by optical detectors located behind the bending posts.

7 Claims, 2 Drawing Figures

CLOSED POSITION

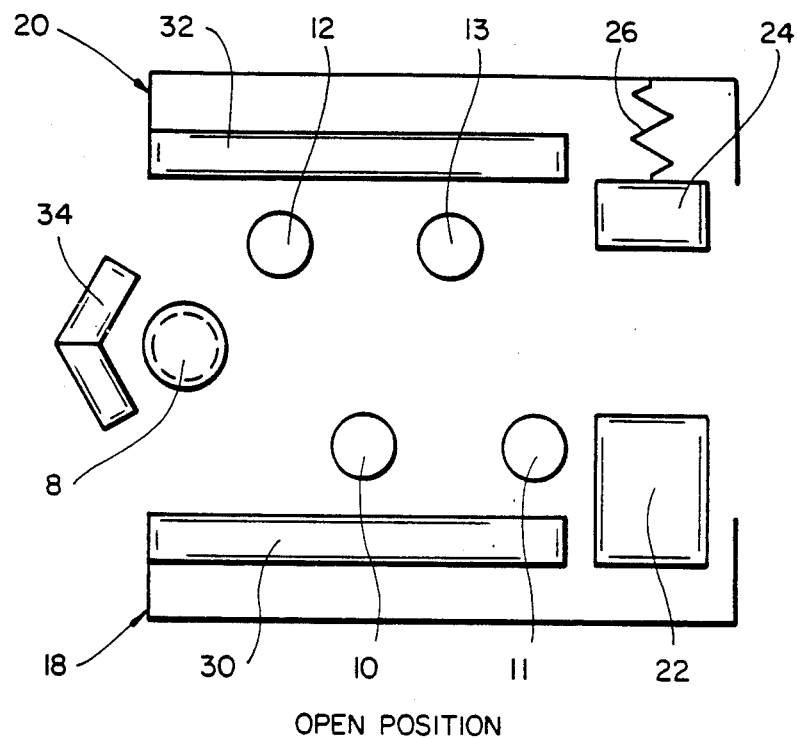
OPEN POSITION
FIG_1
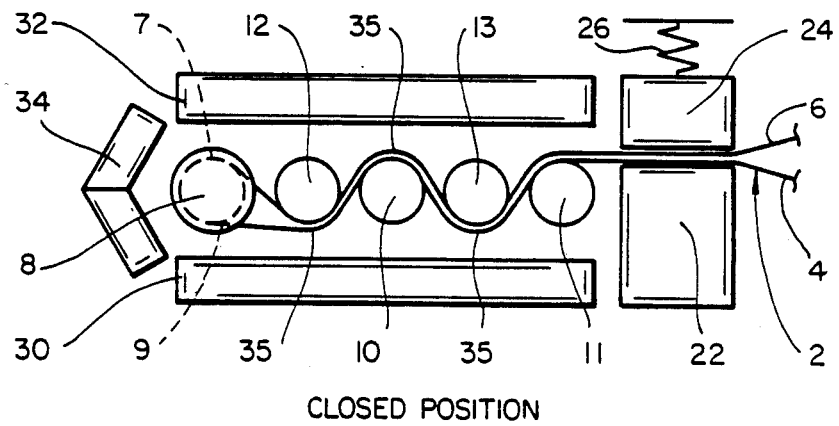
CLOSED POSITION
FIG_2

OPTICAL FIBER COUPLER

BACKGROUND OF THE INVENTION

The present invention relates to a optical coupler for withdrawing light out of an optical fiber, especially an optical coupler suitable for use with an optical fiber contained in a loose tube.

Prior art optical couplers are disadvantageous in that oftentimes they are unusually bulky and rather difficult to use since they require craft sensitivity in inserting an optical fiber therein.

SUMMARY OF THE INVENTION

It is an object of the present invention to eliminate the above-noted drawbacks and to provide an optical coupler which is less craft-sensitive and more compact in size.

According to the invention, an optical coupler includes a retaining post around which an optical fiber is placed, preferably on a grooved section thereof, with the optical coupler further including first and second members movable towards one another with each member having a plurality of posts mounted thereon and offset longitudinally relative to each other such that an in-going and out-going section of the optical fiber are both bent by the bending posts when the first and second members are moved towards each other to their limit position. Preferably, piston means are utilized at a longitudinal end of the optical coupler opposite the retaining posts for engaging the in-going and out-going sections of the optical fiber prior to the first and second movable means reaching their limit position to eliminate any need for the craftsman to hold these sections of the optical fiber as the first and second means are being fixed in their limit movable position.

BRIEF DESCRIPTION OF THE DRAWINGS

FIG. 1 is a plan view of an embodiment in an open position constructed according to the present invention; and FIG. 2 is a plan view of the embodiment of FIG. 1 in its closed position with an optical fiber therein.

DESCRIPTION OF THE PREFERRED EMBODIMENTS

Referring to FIGS. 1 and 2, an optical fiber 2 has a first section 4 which enters the optical coupler and a second section 6 adjacent to the first section which exits the optical coupler in a vicinity of the first section. The fiber is wound around groove 7 formed in a retaining post 8 and around bending posts 10-13. Bending posts 10, 11 are contained on a first movable member 18 while bending posts 12, 13 are contained in a second movable member 20. Though the first and second movable members 18, 20 can each be movable, it can readily be appreciated that this is not necessay according to the invention, and alternatively either one or the other member 18, 20 can be rendered movable with respect to the other member. First and second confronting members 22, 24 are disposed in a vicinity of one end of the coupler where the optical fiber 2 enters the coupler, and either one or both of these members 22, 24 are biased, preferably by a spring 26, so as to firmly clamp the sections 4, 6 of the optical fiber just prior to the members 18, 20 reaching their limit movable closed positions.

In operation, the members 18, 20 are separated such that the bending posts 10-13 are in positions indicated in FIG. 1, and the optical fiber 2 is inserted into the optical coupler, preferably from above, so that a section 9 of the optical fiber 2 is wound around the retaining post 8. The groove 9 formed on a cylindrical surface of the post 8 precisely positions the optical fiber vertically in the coupler. The first and second sections 4, 6 of the optical fiber are held by the craftsman at a position to the right of the members 22, 24, and subsequently the movable members 18, 20 are moved relative to each other which causes the emerging members 22, 24 to grasp the optical fiber 2 in a vicinity of the sections 4, 6, thus alleviating the need for the craftsman to further hold onto these sections. Preferably, the engaging members engage the optical fiber just prior to the bending posts 10-13 exerting maximum bending amounts on the fiber 2. Thereafter, the members 18, 20 are further moved relative to each other until a limit movable position is reached, this limit position being illustrated in the drawing such that the posts 10-13 are linearly disposed. Though the members 22, 24 are illustrated as being linearly disposed in the closed portion of the coupler, it should be appreciated that they do not necessarily need to be so, and the members 18, 20 can be moved such that the posts 11, 13 pass the posts 10, 12 or alternatively stop just prior to passing the posts 10, 12. Moving the members 18, 20 subsequent to the members 22, 24 engaging the fiber in a vicinity of sections 4, 6 results in optimum tension being applied to bent portions of the optical fiber, and any excess stress in the fiber is prevented by providing a spring constant of the spring 26 which allows the fiber to slide between the members 22, 24 if excess force is exerted by the posts 10-13. Preferably, surfaces of the members 22, 24 engaging the fiber 2 are made of a soft material to minimize microbending of the fiber and the chances of damaging the fiber. Reference numerals 30, 32 represent optical detectors for detecting light emitted from bent portions of the optical fiber 2, reference numeral 34 represents a reflector for reflecting light emitted from bend portions of the optical fiber towards the detectors 30, 32, and components used for interconnecting the posts 8, 10-13 and members 22, 24 with the members 18, 20 are preferably mirrored surfaced so as to reflect as much light as possible which may impinge thereon towards the detector 30, 32.

It will be appreciated that when the members 18, 20 are moved together to their limit movable position, a plurality of bends 35 are induced in both the in-going section 4 of the optical fiber and in the out-going section 6 of the optical fiber with the in-going section meeting the out-going section at the retaining post 8. Accordingly, as light travels down the in-going section thereof, and around the bends, mode mixing occurs and light is scattered out of the optical fiber 2 and is either reflected towards the detectors 30, 32 or directly impinges thereon without being reflected. Preferably, the detectors 30, 32 extend longitudinally from the retaining post 8 to the right-most bending post 13, though it will be appreciated shorter detectors 30, 32 can be utilized if desired. Initially very little light escapes in-going section 4 of the optical fiber 2 as the fiber is first bent around the bending post 13 since initially, predominantly a mode mixing phenomena occurs, rather than light scattering out of the fiber, wherein core modes are converted into cladding modes, possibly buffer modes, and possibly even tube modes in the case where the fiber is contained in a loose tube.

The optical coupler of the present invention is most suited for withdrawing light from an optical fiber comprising a core, a cladding, and a buffer surrounding the core and cladding, the buffer protecting the core and cladding from moisture, the fiber comprising the core, cladding, buffer being retained loosely in a tube. The bending posts 10, 13 and the retaining post 8 bend the fiber such that an internal resilience of the fiber causes an outer surface of the buffer to contact an inner surface of the tube at the bends, thus eliminating an air interface therebetween so as to facilitate withdrawal of light from the optical fiber.

What is claimed is:

1. An optical coupler for withdrawing light from an optical fiber comprising a core surrounded by a cladding surrounded by a buffer, the buffer protecting the core and cladding from moisture, comprising:
   at least one first post;
   at least one second post;
   first means for mounting the at least one first post thereon;
   second means for mounting the at least one second post thereon, the first and second means being movable relative to one another;
   a retaining post, an intermediate portion of the optical fiber being wound around the retaining post such that an in-going section of the optical fiber and an out-going section of the optical fiber are both wrapped around each of the one first and second posts and bent therearound; and
   detector means for detecting light emitted from the optical fiber bent by the one first and second posts.

2. The optical coupler as claimed in claim 1, further comprising means for engaging the in-going and out-going sections of the optical fiber, the engaging means engaging the in-going and out-going sections of the optical fiber as the first and second means are moved toward one another and prior to the first and second means reaching their limit movable closed position.

3. The optical coupler first claimed in claim 2, further comprising a reflector for reflecting light towards the detector means.

4. The optical coupler as claimed in claim 2, the detector means comprising first and second optical detectors, the first optical detector being mounted behind the one first post, the second optical detector being mounted behind the one second post.

5. The optical coupler as claimed in claim 1, the optical fiber being loosely retained in a tube and being bent by the one first and second tubes so as to eliminate an air interface between the optical fiber buffer and the tube at bent sections of the fiber.

6. The optical coupler as claimed in claim 2, the ingoing and out-going sections of the optical fiber entering and exiting the coupling at one longitudinal end of the coupler.

7. The optical coupler as claimed in claim 1, further comprising an additional first post and an additional second post, the first posts being offset from the second posts longitudinally so as to be capable of being longitudinally aligned when the first and second means are moved towards each other.

* * * * *